United States Patent
Liu et al.

(10) Patent No.: US 10,929,514 B2
(45) Date of Patent: Feb. 23, 2021

(54) USER REGISTRATION METHOD AND DEVICE FOR SMART ROBOTS

(71) Applicant: Goertek Inc., Weifang (CN)

(72) Inventors: Cui Liu, Weifang (CN); Honglong Ma, Weifang (CN); Chuan Chen, Weifang (CN)

(73) Assignee: Goertek Inc., Weifang (CN)

( * ) Notice: Subject to any disclaimer, the term of this patent is extended or adjusted under 35 U.S.C. 154(b) by 318 days.

(21) Appl. No.: 15/765,971

(22) PCT Filed: Aug. 14, 2017

(86) PCT No.: PCT/CN2017/097340
§ 371 (c)(1),
(2) Date: Apr. 4, 2018

(87) PCT Pub. No.: WO2018/033038
PCT Pub. Date: Feb. 22, 2018

(65) Prior Publication Data
US 2018/0300468 A1     Oct. 18, 2018

(30) Foreign Application Priority Data

Aug. 15, 2016   (CN) .......................... 2016 1 0670194

(51) Int. Cl.
*G06F 21/32*     (2013.01)
*G06K 9/00*      (2006.01)
(Continued)

(52) U.S. Cl.
CPC ............ *G06F 21/32* (2013.01); *G06F 9/4451* (2013.01); *G06K 9/00288* (2013.01);
(Continued)

(58) Field of Classification Search
CPC ........................... G06F 21/32; H04L 2463/082
See application file for complete search history.

(56) References Cited

U.S. PATENT DOCUMENTS

| 6,748,356 B1 * | 6/2004 | Beigi | ...................... G10L 17/04 |
| | | | 704/245 |
| 2002/0169609 A1 * | 11/2002 | Kemp | ...................... G10L 17/04 |
| | | | 704/246 |

(Continued)

FOREIGN PATENT DOCUMENTS

| CN | 103475490 A | 12/2013 |
| CN | 104270338 A | 1/2015 |

(Continued)

OTHER PUBLICATIONS

English machine translation of WO 2017/201675 A1, 12 pages (Year: 2016).*
First Office Action Trans, dated Jun. 30, 2016, Goertek, Inc.

*Primary Examiner* — Thaddeus J Plecha
(74) *Attorney, Agent, or Firm* — LKGlobal | Lorenz & Kopf, LLP (57) ABSTRACT

A user registration method and a device for a smart robot. The method comprises: conducting a voice dialogue with a new user to be registered, acquiring a user name of the user from the voice dialogue, and simultaneously collecting biological characteristic information that can uniquely identify the user; wherein the biological characteristic information comprises at least two different types of biological characteristic information, judging whether at least one type of the biological characteristic information satisfies a corresponding preset registration condition, and if yes, using the biological characteristic information that satisfies the preset registration condition as a characteristic template, establishing a correspondence relation between the characteristic template and the user name, and saving the correspondence relation, to complete the user registration.

16 Claims, 2 Drawing Sheets

(51) Int. Cl.
  *G06F 9/445* (2018.01)
  *G10L 17/24* (2013.01)
(52) U.S. Cl.
  CPC .......... G06K 9/00926 (2013.01); G10L 17/24 (2013.01); *G06F 2221/2117* (2013.01)
(56) References Cited

U.S. PATENT DOCUMENTS

| | | | | |
|---|---|---|---|---|
| 2003/0125944 | A1* | 7/2003 | Wohlsen | G10L 17/24 704/246 |
| 2008/0082692 | A1* | 4/2008 | Yano | G06Q 10/02 709/246 |
| 2009/0312869 | A1* | 12/2009 | Ohnaka | G06K 9/00288 700/253 |
| 2012/0188056 | A1* | 7/2012 | Sahin | G06K 9/6277 340/5.82 |
| 2013/0159003 | A1* | 6/2013 | Kim | G10L 15/1822 704/275 |
| 2014/0215586 | A1* | 7/2014 | Tilton | G06F 21/34 726/6 |
| 2015/0261944 | A1* | 9/2015 | Hosom | G06F 21/32 726/19 |
| 2017/0323644 | A1* | 11/2017 | Kawato | G06Q 40/04 |
| 2017/0372049 | A1* | 12/2017 | Tieu | C08G 61/123 |

FOREIGN PATENT DOCUMENTS

| | | |
|---|---|---|
| CN | 104598795 A | 5/2015 |
| CN | 104598796 A | 5/2015 |
| CN | 106295299 A | 1/2017 |
| EP | 3185162 A1 | 4/2015 |
| WO | WO2016026325 A1 | 4/2015 |
| WO | WO-2017201675 A1 * 11/2017 ............. G06F 21/32 |

\* cited by examiner

USER REGISTRATION METHOD AND DEVICE FOR SMART ROBOTS

CROSS REFERENCE TO RELATED APPLICATIONS

This application is a National Stage entry of International Application No. PCT/CN2017/097340, filed on Aug. 14, 2017, which claims priority to Chinese Patent Application No. 201610670194.5, filed on Aug. 15, 2016. The disclosures of the priority applications are hereby incorporated in their entirety by reference.

FIELD OF THE INVENTION

The present disclosure relates to the technical field of smart home appliance, and particularly relates to a user registration method and device for a smart robot.

BACKGROUND OF THE INVENTION

As science and technology continuously advance and the robot technology continuously develops, smart robots gradually enter daily life and bring great convenience to human life, and especially add much fun to the life of the elder and children.

In the user registration methods of the existing smart robots in the market, for example, the users must manually input their basic information such as the user name, and input identification information such as the fingerprint, so the registration process is complicated and difficult to operate for children or the elder, and the user experience is poor.

SUMMARY OF THE INVENTION

The present disclosure provides a user registration method and device for a smart robot, to solve the problems of the conventional user registration of a smart robot that the registration process is complicated and the user experience is poor.

According to one aspect of the present disclosure, there is provided a user registration method for a smart robot, wherein the method comprises:

conducting a voice dialogue with a new user to be registered, acquiring a user name of the user from the voice dialogue, and simultaneously collecting biological characteristic information that can uniquely identify the user, wherein the biological characteristic information comprises at least two different types of biological characteristic information;

judging whether at least one type of the biological characteristic information satisfies a corresponding preset registration condition; and if yes, using the biological characteristic information that satisfies the preset registration condition as a characteristic template, establishing a correspondence relation between the characteristic template and the user name, and saving the correspondence relation, to complete the user registration.

The present disclosure further provides a user registration device for a smart robot which shares the same invention concept with the above user registration method for a smart robot, wherein the device comprises:

a characteristic collecting unit, for conducting a voice dialogue with a new user to be registered, acquiring a user name of the user from the voice dialogue, and simultaneously collecting biological characteristic information that can uniquely identify the user, wherein the biological characteristic information comprises at least two different types of biological characteristic information;

a characteristic judging unit, for judging whether at least one type of the biological characteristic information satisfies a corresponding preset registration condition; and a registering unit, for, when the characteristic judging unit determines that at least one type of the biological characteristic informations satisfies a corresponding preset registration condition, using the biological characteristic information that satisfies the preset registration condition as a characteristic template, establishing a correspondence relation between the characteristic template and the user name, and saving the correspondence relation, to complete the user registration.

The present disclosure further provides a user registration device for a smart robot which shares the same invention concept with the above user registration method for a smart robot, wherein the device comprises a machine readable storage medium and a processor, the machine readable storage medium and the processor are communicatively connected by an internal bus, the machine readable storage medium stores a computer program that can be executed by the processor, and when the computer program is executed by the processor the steps of the above method are realized.

The present disclosure can achieve the following advantageous effects. According to the technical solutions of the embodiments of the present disclosure, interaction with the user is conducted by a voice dialogue, the user registration is completed by collecting the biological characteristic information that can uniquely identify the new user to be registered, and at least two different types of biological characteristic information is simultaneously collected. In the collecting process, once the collecting of one type of the biological characteristic information satisfies the registration condition, the user registration can be completed by using the collected biological characteristic information. Therefore, compared with the user registration flow in the prior art in which complicated information manual inputting and collecting of more than one type of information of the user are needed, and the more than one type of information must all satisfy the condition to complete the registration, the present disclosure avoids the complicated user interaction operation in the registration process, greatly simplifies the registration steps, facilitates children and the elder to conduct registration, and optimizes the user experience.

BRIEF DESCRIPTION OF THE DRAWINGS

In order to more clearly illustrate the embodiments of the present disclosure or the technical solutions in the prior art, the figures that are required to describe the embodiments will be briefly introduced below. Accordingly, the figures that are described below are merely embodiments of the present disclosure, and a person skilled in the art can obtain other figures according to these figures without paying creative work.

DETAILED DESCRIPTION OF THE PRESENT INVENTION

The inventive concept of the present disclosure is as follows. Regarding the problem of the user registration for a smart robot in the prior art that the registration process is complicated, the embodiments of the present disclosure propose to take advantage of the voice interaction mode, and collect at least two different types of biological characteristic information of a new user to be registered, and once the collecting of at least one type of the biological characteristic information is completed and reaches the requirements, the information collecting is completed, and then the smart robot may independently complete the registration process by using the collected information, thereby it shortens the user registration duration, facilitates the users such as children and the elder that do not well know the complicated registration process to conduct registration, and improves the use experience of the user.

Embodiments of the present disclosure are mainly applied in the application scenes, such as the cognition field in which the safe class is relatively low (for example, the process of the robot getting to know the members of family, the safe class of which is relatively low), simultaneously record the characteristic templates by using two techniques of collecting and identifying biological characteristics (a voiceprint characteristic and a human face image characteristic). During the characteristic template recording, in order to facilitate the users such as children and the elder that do not well know the complicated registration process to conduct registration, when the recording of any one type of the biological characteristic templates is completed and reaches the requirements, the recording is completed, to improve the use experience of the user, and the characteristic template is continuously optimized during the process of the subsequent user logging on and verification. Accordingly, the embodiments of the present disclosure simplify the user registration flow, improve the identification rate of the user logging on and verification, and ensure that the interaction between the smart robot and the user is natural and fluent.

It should be noted that, the embodiments described below are merely part of the embodiments of the present disclosure, rather than all of the embodiments. All the other embodiments that are obtained on the basis of the embodiments of the present disclosure by a person skilled in the art without paying creative work shall fall within the protection scope of the present disclosure.

First Embodiment

Figure 1:
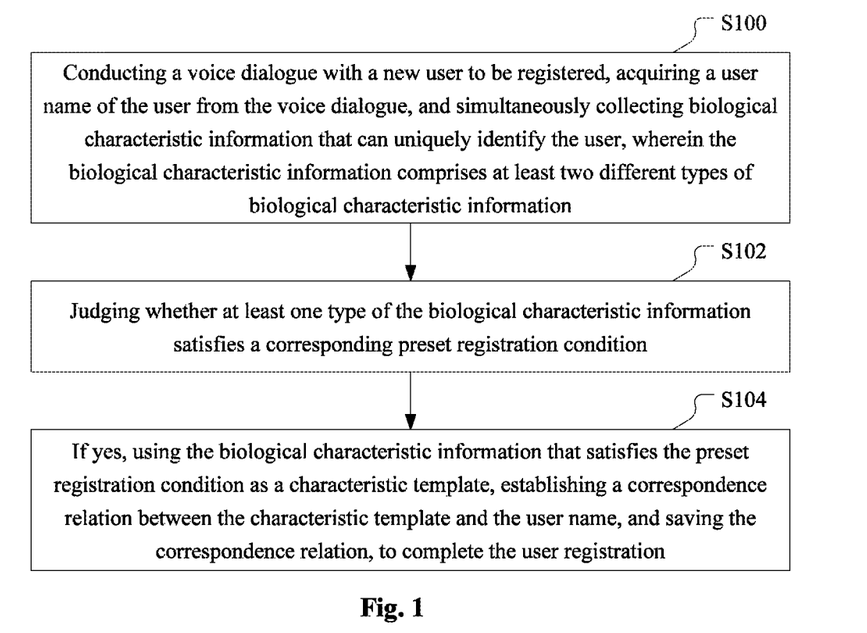
FIG. 1 is the schematic flow diagram of the user registration method for a smart robot of an embodiment of the present disclosure.

FIG. 1 is the schematic flow diagram of the user registration method of an smart robot of an embodiment of the present disclosure. Referring to FIG. 1, the user registration method for a smart robot of the present embodiment comprises:

Step S100, conducting a voice dialogue with a new user to be registered, acquiring a user name of the user from the voice dialogue, and simultaneously collecting biological characteristic information that can uniquely identify the user, wherein the biological characteristic information comprises at least two different types of biological characteristic information.

The collected biological characteristic information may be voiceprint characteristic information, human face image characteristic information, fingerprint characteristic information, etc. Preferably, the two different types of biological characteristic information is voiceprint characteristic information and human face image characteristic information. Because the voiceprint and human face of everybody are unique, in the present embodiment, the voiceprint characteristic and/or the human face image characteristic of a user are collected as the biological characteristic information to identify the user. In addition, the voiceprint and the human face image are collected by a silent collecting mode, that is, the collecting can be completed without user intervention. Compared with intervening information collecting modes such as that requires user manual input (such as a fingerprint characteristic), collecting the voiceprint characteristic and the human face image characteristic brings a better user experience.

Step S102, judging whether at least one type of the biological characteristic information satisfies a corresponding preset registration condition.

Step S104, if yes, using the biological characteristic information that satisfies the preset registration condition as a characteristic template, establishing a correspondence relation between the characteristic template and the user name, and saving the correspondence relation, to complete the user registration.

It can be known from FIG. 1 that, in the present embodiment, the user registration is completed by acquiring the user name of a new user by a voice dialogue, acquiring the biological characteristic information of the user simultaneously during the voice dialogue, and establishing the correspondence relation between the collected biological characteristic information and the acquired user name. Therefore, the user does not need to manually input any information, a new user can complete the user registration process by merely simply conducting voice interaction with the smart robot, and thereby the present embodiment avoids the complicated user interaction operation in the registration process, shortens the registration duration, facilitates children, the elder and users that do not well know the registration flow to conduct registration, and optimizes the user experience. The acquired biological characteristic information at least includes two types of biological characteristic information, the user registration can be completed as long as one type of the biological characteristic information satisfies the registration condition in the process of acquiring, and thereby the present embodiment simplifies the registration steps, and improves the user satisfaction.

In order to ensure providing a good experience of logging on and verification after the user registration, the embodiments of the present disclosure further provide a process of optimizing the characteristic template that is collected in the registration process, to adapt for the change in the voiceprint or human face image of the user, and increase the user identification rate. A detailed illustration is as follows.

Second Embodiment

In the present embodiment, the user registration method for a smart robot of the present disclosure is illustrated in two parts. The basis of the application of the embodiments of the present disclosure is that the smart robot possesses voice interaction function, and the user registration is completed on the basis of the voice interaction.

Figure 2:
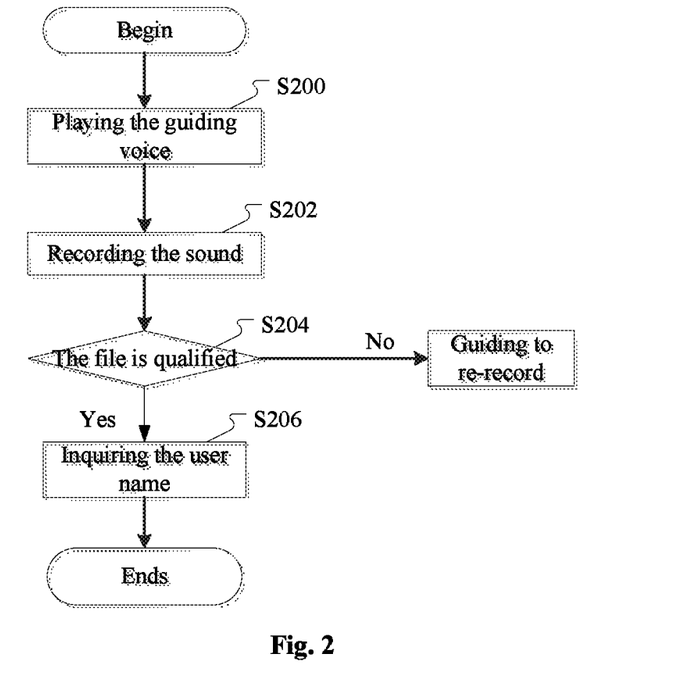
FIG. 2 is the schematic flow diagram of the characteristic template collecting of the user registration method for a smart robot of an embodiment of the present disclosure.

The first part is characteristic template recording. FIG. 2 is the schematic flow diagram of the characteristic template collecting of the user registration method for a smart robot of an embodiment of the present disclosure.

Referring to FIG. 2, the flow of voiceprint characteristic template collecting is as follows:

When the flow begins, Step S200 is executed, and the guiding voice is played; then the flow enters Step S202.

In Step 200, the smart robot is controlled to play the guiding voice that is recorded in advance, and guide the user to make a dialogue.

In Step S202, the sound is recorded.

In Step S202, user voice data is collected by a microphone, and the smart robot conducts daily information communication with the user, and guides the user to chat by an smart voice dialogue, to obtain more voice fragments. On the basis of the collected voice file, the voiceprint characteristic information is obtained by extracting from the user voice data (that is, the voice file) that were collected and saved during the voice dialogue with the user.

In Step S204, it is judged whether the file is qualified.

In this step, it is particularly judged whether the voiceprint characteristic information that is extracted from the voice file satisfies a preset registration condition; if yes, the flow enters Step S206; if no, the user is guided to re-record (for example, playing the guiding voice, and guiding the user to cooperate to re-record the voice signal).

Here, the preset registration condition may be that the similarity degree between the voiceprint characteristic information collected this time and a pre-stored reference voiceprint information is higher than a preset similarity degree threshold.

For example, voiceprint characteristic points are extracted from the voice signal by using pattern recognition, and the extracted voiceprint characteristic points are matched with the characteristic points in the reference voiceprint information that serves as the evaluation criteria; if the ratio of the number of the same characteristic points between them to the total number of the characteristic points (that is, the similarity degree) reaches a preset threshold, it is determined that the voiceprint characteristic information collected this time satisfies the registration condition and can serve as the voiceprint characteristic template.

For example, if the similarity degree of the voiceprint characteristic information collected this time is 80%, and the preset voiceprint registration condition is that the similarity degree threshold is higher than or equal to 80%, it is determined that the voiceprint characteristic information collected this time is qualified, and can serve as the voiceprint characteristic template.

In Step S206, the user name is inquired.

It should be noted that, in the present embodiment the user name is inquired in Step S206, but it is not limited thereto. Step S206 may be executed after playing the guiding voice at the beginning, that is, the execution sequence of inquiring the user name is not strictly limited. As a particular mode of inquiring the user name, for example, the smart robot plays the guiding voice "what is your name?" that has been recorded in the process of the voice interaction with the user, then collects the reply of the user by using a microphone, conducts voice recognition to the voice signal of the user reply, and thereby obtains the user name of the user.

It should be added that, an awakening instruction may be given by the user before the voice interaction between the smart robot and the user begins, that is, the smart robot is awakened by user triggering, the triggering mode may be touch awakening, key pressing awakening, preset voice awakening, etc. Certainly, the smart robot may initiatively identify that a user is in the vicinity, and initiatively play the guiding voice, to guide the user to make a dialogue with it.

It can be understood that, how to extract the user name from the voice signal by voice recognition belongs to the prior art and its realizing details can refer to the prior art and will not be discussed here.

The flow ends when the user name of the user and the qualified voiceprint characteristic information are obtained.

It should be emphasized that, in the process of executing the steps shown in FIG. 2, a camera may also be simultaneously controlled to turn on and collect the human face image of the user, and on the basis of the collected human face image file, the human face image characteristic information is extracted from the human face image file. Using the same algorithm as the above algorithm for judging whether the voiceprint file is qualified, it is judged whether the human face image characteristic information collected this time satisfies the preset human face image registration condition; if yes, it is determined that the human face characteristic information collected this time is qualified, and can serve as the human face image characteristic template.

In addition, in the present embodiment, two types of biological characteristic information of the user are collected simultaneously, the collecting of biological characteristic information can stop as long as one of the two types of biological characteristic information satisfies the registration condition, and then the user registration is completed by using the collected biological characteristic information, so it is not required that the two types of biological characteristic information both satisfy the registration condition, and the registration flow is simplified.

It can be seen here that, in the embodiments of the present disclosure, during the collecting of biological characteristic information, each type of the biological characteristic information is correspondingly provided with an evaluation criterion, for example, a voiceprint characteristic evaluation criterion and a human face characteristic evaluation criterion.

The voiceprint characteristic evaluation criterion is generally the length of the collected user voice signal (a too short voice signal will result in that the effective voiceprint characteristic cannot be extracted), or the degree that the user voice signal can represent the current user. Because the user speaks relatively freely and the environment may change at any moment, in the present embodiment, every time after collecting the voice signal, the effective voiceprint characteristic information is extracted from the voice signal, and the quality of the voiceprint characteristic information collected at one time is calculated by using a pre-defined algorithm and the voiceprint characteristic evaluation criterion, to obtain the quality score of the voiceprint characteristic information collected this time, thereby evaluating the quality of the voiceprint characteristic information that is currently collected.

For example, the process of calculating the quality of the voiceprint characteristic information collected at one time by using a pre-defined algorithm and the voiceprint characteristic evaluation criterion may be as follows: judging the length of the voice signal collected at one time, for example, 5 seconds; comparing the 5 s with the standard reference length of the voice signal (for example 15s); as the difference between 5 s and 15 s is relatively large, scoring the voice signal collected this time a low score, for example, 3 points, which indicates that the quality of the voice signal collected this time is poor.

Due to the influence of conditions such as light, the human face images of the user collected at different time may be different. Therefore, in the present embodiment, in order to increase the user identification rate, the human face image characteristic information is strictly screened during the user registration. Regarding the human face characteristic information, the images of the user in three directions are generally required, such as a front face image, a left side face image and a right side face image. The more the samples are, the higher the identification rate is.

According to the human face image evaluation criterion (for example, the white balance information, the noise point information etc. of an image) and a pre-defined algorithm, the quality of the human face image characteristic information collected every time is calculated, and the corresponding quality scores are obtained, to judge whether the human face image characteristic information collected this time can serve as the characteristic template. For example, the threshold of the quality score that serves as the characteristic template may be set in advance, then the quality scores of the human face image characteristic information collected every time are compared with the quality score threshold, and the quality score higher than the quality score threshold can be determined to serve as the human face image characteristic template.

The template is saved after successfully recorded, and is used for the user identification and verification when the user is logging on at a later time. The second part is characteristic template optimizing.

In the present embodiment, the characteristic template optimizing is conducted in the process of the user logging on and verification. In the verification and identification, the verification can be completed as long as the identification confidence level of either of the human face image characteristic and the voiceprint characteristic reaches the requirement of the confidence level. Additionally, in the verification process, the template data are simultaneously supplemented to supplement the unfinished registration modes; or the existing characteristic template is updated to increase the precision of the existing template, so as to obtain better effects of logging on and verification. That is, if characteristic information more reliable than the original template is captured, the characteristic information corresponding to the original template is replaced, and if the characteristic information corresponding to the original template is insufficient, it will be continually supplemented in the verification process.

Particularly, the characteristic template optimizing comprises two cases: one is the updating of the characteristic template, and the other is the supplementing of the characteristic template.

When the smart robot receives an awakening instruction given by a predetermined user and is awakened, the smart robot judges whether the predetermined user is a user that has been registered. As a particular judging mode, the saved characteristic templates corresponding to each of users that have been registered are searched, and it is judged whether information matching with the currently collected biological characteristic information of the predetermined user exists in the characteristic templates; if not, the predetermined user is determined as a new user, and the process enters the user registration flow; if yes, the user name of the predetermined user is identified out according to the correspondence relation between the corresponding characteristic template and the user name of the user that has been registered.

As a particular realizing mode of the characteristic template supplementing, after identifying out the user name of the predetermined user, the user registration method of the present embodiment further comprises: when it is determined that the characteristic templates merely comprise a first characteristic template corresponding to first biological characteristic information, continuing a voice dialogue with the predetermined user, collecting second biological characteristic information of the predetermined user whose type is different from the first biological characteristic information in the first characteristic template, and saving the collected second biological characteristic information that satisfies a preset corresponding registration condition to the characteristic template corresponding to the predetermined user, as a second characteristic template.

That is, if the characteristic template corresponding to the user that has been registered includes only one biological characteristic template, for example, a voiceprint characteristic template only, after the user logs on to the smart robot and during the process of the voice interaction with the smart robot, the human face image of the user is silently collected, then the human face image characteristic information is extracted, and the extracted human face image characteristic information is compared with the preset human face image registration condition; if the registration condition is satisfied, the human face image characteristic information collected this time is supplemented to the human face image characteristic template corresponding to the predetermined user, and serves as a second characteristic template, to facilitate the subsequent use.

As a particular realizing mode of the characteristic template updating, after identifying out the user name of the predetermined user, it is calculated whether currently collected current biological characteristic information corresponding to the first characteristic template is superior to the first biological characteristic information in the first characteristic template, and if yes, the first biological characteristic information in the first characteristic template corresponding to the predetermined user is replaced by the currently collected current biological characteristic information, and then the currently collected current biological characteristic information is saved; and/or it is calculated whether currently collected real-time biological characteristic information corresponding to the second characteristic template is superior to the second biological characteristic information in the second characteristic template, and if yes, the second biological characteristic information in the second characteristic template corresponding to the predetermined user is replaced by the currently collected real-time biological characteristic information, and then the currently collected real-time biological characteristic information is saved.

Here, according to the difference between the currently collected biological characteristic information, the updating modes of the characteristic template are different.

For example, if the currently collected biological characteristic information includes merely one type of biological characteristic information, for example, the voiceprint characteristic information, in the characteristic template updating, only the currently collected current voiceprint characteristic information is compared with the voiceprint characteristic information corresponding to the voiceprint characteristic template in the saved characteristic template, and it is calculated which is better, in order to use the better voiceprint characteristic information as the voiceprint characteristic information corresponding to the voiceprint characteristic template in the characteristic template.

If the currently collected biological characteristic information includes two types of biological characteristic information, for example, the voiceprint characteristic information and the human face image characteristic information, in the characteristic template updating, the currently collected current voiceprint characteristic information is compared with the voiceprint characteristic information corresponding to the voiceprint characteristic template in the saved characteristic template, and the currently collected real-time human face image characteristic information is compared with the human face image characteristic information corresponding to the human face image characteristic template in the saved characteristic template, and it is calculated which is better, in order to use the better characteristic information as the characteristic information corresponding to the corresponding characteristic templates in the characteristic templates.

The present embodiment further provides a calculating mode of judging whether the currently collected current biological characteristic information is superior to the first biological characteristic information in the first characteristic template, particularly, a quality score that can be used to evaluate the quality of the currently collected current biological characteristic information is calculated, and the quality score of the current biological characteristic information is compared with the quality scores of the first biological characteristic information in each of the first characteristic templates; if the quality score of the current biological characteristic information is higher than the quality score of the first biological characteristic information in the first characteristic template that has the lowest quality score, it is determined that the currently collected current biological characteristic information is superior to the first biological characteristic information in the first characteristic template, and the current biological characteristic information is saved in the first characteristic template as the first biological characteristic information.

Particularly, the principle of characteristic template updating is based on the quality evaluation criterions of the characteristic template. When the similarity degree (or identification confidence level) between the current biological characteristic of the user to be identified and the characteristic in the characteristic template reaches a preset threshold, it can be considered that the current user and the corresponding user that is saved in the characteristic template are the same user, and the user identification is completed. At this point, the current biological characteristic information of the user may also be saved as the characteristic template to facilitate the subsequent use. In the present embodiment, the template quality is evaluated by other algorithms, and if the quality score of the current biological characteristic is superior to the worst template in characteristic template, replaces it. Generally, more than one template corresponds to each of the biological characteristic information.

It should be noted that, the above mode of calculating the template quality also applies to the judging of the updating of the second biological characteristic template, particularly, a quality score that can be used to evaluate the quality of the currently collected real-time biological characteristic information is calculated, and the quality score of the real-time biological characteristic information is comparing with the quality scores of the second biological characteristic information (such as the human face image characteristic reference information) in each of the second characteristic templates; if the quality score of the real-time biological characteristic information is higher than the quality score of the second biological characteristic information in the second characteristic template that has the lowest quality score, it is determined that the currently collected real-time biological characteristic information is superior to the second biological characteristic information in the second characteristic template, and the better biological characteristic information is used as the characteristic information corresponding to the corresponding characteristic template in the characteristic template.

The characteristic template optimizing is completed by the above process, and it is ensured that a high identification rate of the user is provided in the logging on and verification, thereby the use experience of the user is improved.

Third Embodiment

The user registration method of the embodiments of the present disclosure is illustrated below by a particular application scene.

In user registration, the user is guided to record the characteristic template by a voice dialogue. The process is as follows:

User: Harry, Harry! (the awakening word)

Robot: Hi, good morning, what is your name?

Note: It is controlled that while the smart robot talks, the camera is turned on to collect the human face image information of the user and when the robot stops talking, the recording function is turned on to record the user voice.

User: I am Xiao Ming, nice to meet you!

Note: The user name "Xiao Ming" is extracted from the voice signal of the user reply.

Robot: Nice to meet you! Xiao Ming, we can play together from now on.

Note: It is controlled that the recording stops when the smart robot begins to speak, and the recording starts when the smart robot finishes speaking, to effectively collect the voice signal of the user, and reduce noise disturbance and the workload of the voice recognition.

It should be emphasized that, in the process of recording the voiceprint template and the human face image template, if either of them reaches the preset requirement, the process of recording the characteristic template can be completed, but the dialogue between the smart robot and the user is not affected, to provide a more fluent and natural user registration experience.

After the user registration, in the logging on, voice interaction is conducted and the user is identified and verified. The process is as follows:

User: Harry, Harry!

Note: After receiving the awakening word given by the user, the robot is controlled to turn on the camera and start the voiceprint characteristic verification. If during the user registration the recording of the human face image characteristic template in the characteristic template of the user does not reach the registration condition, the voiceprint characteristic verification will be used, and simultaneously in the user dialogue the human face characteristic information corresponding to the human face image characteristic template is supplemented. If during the user registration the recording of the voiceprint characteristic template does not reach the requirements, the "Harry Harry" voice signal given by the user is saved, and the voice signal is continually collected in the process of communication with the user, and the voiceprint characteristic information is extracted to supplement the voiceprint characteristic template.

Robot: Hi, Xiao Ming, good morning!

In addition, it should be emphasized that, each of the characteristic templates is compared with the evaluation criterions of the characteristic template that is correspondingly provided, to obtain a new characteristic template, and the new characteristic template may according to the comparison result supplement or replace the original characteristic template, by merely replacing the background file.

Fourth Embodiment

Figure 3:
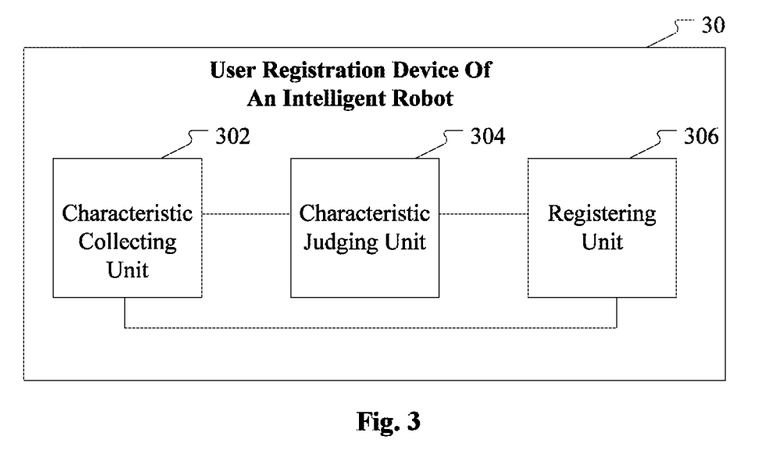
FIG. 3 is the functional block diagram of the user registration device for a smart robot of an embodiment of the present disclosure.

FIG. 3 is the functional block diagram of the user registration device for a smart robot of an embodiment of the present disclosure. Referring to FIG. 3, the user registration device 30 for a smart robot of the present embodiment comprises:

a characteristic collecting unit 302, for conducting a voice dialogue with a new user to be registered, acquiring a user name of the user from the voice dialogue, and simultaneously collecting biological characteristic information that can uniquely identify the user, wherein the biological characteristic information comprises at least two different types of biological characteristic information, the collected biological characteristic information may be voiceprint characteristic information, human face image characteristic information, fingerprint characteristic information, etc., and preferably, the two different types of biological characteristic information is voiceprint characteristic information and human face image characteristic information;

a characteristic judging unit 304, for judging whether at least one type of the biological characteristic information satisfies a corresponding preset registration condition; and a registering unit 306, for, when the characteristic judging unit 304 determines that at least one type of the biological characteristic information satisfies a corresponding preset registration condition, using the biological characteristic information that satisfies the preset registration condition as a characteristic template, establishing a correspondence relation between the characteristic template and the user name, and saving the correspondence relation, to complete the user registration.

In an embodiment of the present disclosure, the characteristic collecting unit 302 is further for receiving an awakening instruction given by a predetermined user, conducting a voice dialogue with the user, and simultaneously collecting biological characteristic information of the predetermined user.

The characteristic judging unit 304 is for searching saved characteristic templates corresponding to each of users that have been registered, and judging whether information that matches with the currently collected biological characteristic information of the predetermined user exists in the characteristic templates.

The device 30 further comprises a user identifying unit, and the user identifying unit is for, when the characteristic judging unit 304 determines that information that matches with the currently collected biological characteristic information of the predetermined user does not exist in the characteristic templates, determining the predetermined user as a new user, and when the characteristic judging unit 304 determines that information that matches with the currently collected biological characteristic information of the predetermined user exists in the characteristic templates, according to the correspondence relation between the corresponding characteristic template and the user name of the user that has been registered, identifying out the user name of the predetermined user.

In an embodiment of the present disclosure, the characteristic collecting unit 302 is further for, when the characteristic templates merely comprise a first characteristic template corresponding to first biological characteristic information, after identifying out the user name of the predetermined user, during the process of continuing the voice dialogue with the predetermined user, collecting second biological characteristic information of the predetermined user whose type is different from the first biological characteristic information in the first characteristic template.

The registering unit 306 comprises a template supplementing subunit, and the template supplementing subunit is for saving second biological characteristic information that satisfies a preset corresponding registration condition in the characteristic template corresponding to the predetermined user, as a second characteristic template.

In the present embodiment, the registering unit 306 further comprises: a template updating subunit, for calculating whether currently collected current biological characteristic information corresponding to the first characteristic template is superior to the first biological characteristic information in the first characteristic template, and if yes, replacing the first biological characteristic information in the first characteristic template corresponding to the predetermined user by the currently collected current biological characteristic information, and saving the currently collected current biological characteristic information; and/or, calculating whether currently collected real-time biological characteristic information corresponding to the second characteristic template is superior to the second biological characteristic information in the second characteristic template, and if yes, replacing the second biological characteristic information in the second characteristic template corresponding to the predetermined user by the currently collected real-time biological characteristic information, and saving the currently collected real-time biological characteristic information.

In an embodiment of the present disclosure, the template updating subunit is particularly for calculating a quality score that can be used to evaluate the quality of the currently collected current biological characteristic information, and comparing the quality score of the current biological characteristic information with the quality scores of the first biological characteristic information in each of the first characteristic templates;

if the quality score of the current biological characteristic information is higher than the quality score of the first biological characteristic information in the first characteristic template that has the lowest quality score, determining that the currently collected current biological characteristic information is superior to the first biological characteristic information in the first characteristic template, replacing the first biological characteristic information in the first characteristic template that has the lowest quality score corresponding to the user with the currently collected current biological characteristic information, and saving the currently collected current biological characteristic information; and/or, calculating a quality score that can be used to evaluate the quality of the currently collected real-time biological characteristic information, and comparing the quality score of the real-time biological characteristic information with quality scores of the second biological characteristic information in each of the second characteristic templates; and if the quality score of the real-time biological characteristic information is higher than the quality score of the second biological characteristic information in the second characteristic template that has the lowest quality score, determining that the currently collected real-time biological characteristic information is superior to the second biological characteristic information in the second characteristic template, replacing the second biological characteristic information in the second characteristic template that has the lowest quality score corresponding to the user with the currently collected real-time biological characteristic information, and saving the currently collected real-time biological characteristic information.

Fifth Embodiment

Figure 4:
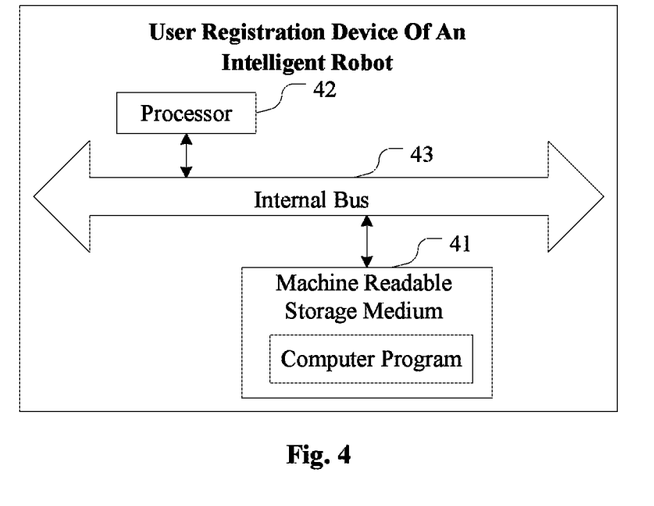
FIG. 4 is the structural block diagram of the user registration device for a smart robot of an embodiment of the present disclosure.

On the basis of the same invention concept as those of the above embodiments, the present embodiment provides a user registration device for a smart robot. FIG. 4 is the structural block diagram of the user registration device for a smart robot of an embodiment of the present disclosure. The device comprises a machine readable storage medium 41 and a processor 42 The machine readable storage medium 41 and the processor 42 are communicatively connected by an internal bus 43. The machine readable storage medium 41 stores a computer program that can be executed by the processor 42, and when the computer program is executed by the processor 42 the following steps will be realized:

conducting a voice dialogue with a new user to be registered, acquiring a user name of the user from the voice dialogue, and simultaneously collecting biological characteristic information that can uniquely identify the user, wherein the biological characteristic information comprises at least two different types of biological characteristic information;

judging whether at least one type of the biological characteristic information satisfies a corresponding preset registration condition; and if yes, using the biological characteristic information that satisfies the preset registration condition as a characteristic template, establishing a correspondence relation between the characteristic template and the user name, and saving the correspondence relation, to complete the user registration.

Optionally, before the conducting a voice dialogue with a new user to be registered, the method further comprises the steps of:

receiving an awakening instruction given by a predetermined user;

conducting a voice dialogue with the predetermined user, and simultaneously collecting biological characteristic information of the predetermined user;

searching the saved characteristic templates corresponding to each of users that have been registered, judging whether information that matches with the currently ed biological characteristic information of the predetermined user exists in the characteristic templates, and if not, determining the predetermined user as a new user; and if yes, the method further comprises the step of: according to the correspondence relation between the corresponding characteristic template and the user name of the user that has been registered, identifying out the user name of the predetermined user.

Optionally, when the characteristic templates merely comprise a first characteristic template corresponding to first biological characteristic information, after identifying out the user name of the predetermined user, the method further comprises the step of:

during the process of continuing the voice dialogue with the predetermined user, collecting second biological characteristic information of the predetermined user whose type is different from the first biological characteristic information in the first characteristic template, and saving the collected second biological characteristic information that satisfies a preset corresponding registration condition to the characteristic template corresponding to the predetermined user, as a second characteristic template.

Optionally, after identifying out the user name of the predetermined user, the method further comprises the steps of:

calculating whether currently collected current biological characteristic information corresponding to the first characteristic template is superior to the first biological characteristic information in the first characteristic template, and if yes, replacing the first biological characteristic information in the first characteristic template corresponding to the predetermined user by the currently collected current biological characteristic information, and saving the currently collected current biological characteristic information; and/or, calculating whether currently collected real-time biological characteristic information corresponding to the second characteristic template is superior to the second biological characteristic information in the second characteristic template, and if yes, replacing the second biological characteristic information in the second characteristic template corresponding to the predetermined user by the currently collected real-time biological characteristic information, and saving the currently collected real-time biological characteristic information.

Optionally, the calculating whether currently collected current biological characteristic information is superior to the first biological characteristic information in the first characteristic template comprises:

calculating a quality score that can be used to evaluate the quality of the currently collected current biological characteristic information, and comparing the quality score of the current biological characteristic information and pre-stored quality scores of reference biological characteristic information in each of the first characteristic templates; and if the quality score of the current biological characteristic information is higher than the quality score of the reference biological characteristic information in the first characteristic template that has the lowest quality score, determining that the currently collected current biological characteristic information is superior to the first biological characteristic information in the first characteristic template.

Optionally, the calculating whether currently collected real-time biological characteristic information corresponding to the second characteristic template is superior to the second biological characteristic information in the second characteristic template comprises:

calculating a quality score that can be used to evaluate the quality of the currently collected real-time biological characteristic information, and comparing the quality score of the real-time biological characteristic information and quality scores of the second biological characteristic information in each of the second characteristic templates;

if the quality score of the real-time biological characteristic information is higher than the quality score of the second biological characteristic information in the second characteristic template that has the lowest quality score, determining that the currently collected real-time biological characteristic information is superior to the second biological characteristic information in the second characteristic template.

Optionally, the two different types of biological characteristic information is voiceprint characteristic information and human face image characteristic information, and the collecting biological characteristic information that can uniquely identify the user comprises: obtaining the voiceprint characteristic information by extracting from the user voice data that were collected and saved during the voice dialogue with the user, and obtaining the human face image characteristic information by extracting from the human face image of the user that was photographed and saved during the voice dialogue with the user.

In the different embodiments, the machine readable storage medium 41 may be an internal storage or a nonvolatile memory. The nonvolatile memory may be a storage driver (such as a hard disk drive), a solid state disk, any type of storage discs (such as optical disk, DVD, etc.), or similar storage medium, or their combinations. The internal storage may be an RAM (Random Access Memory), a volatile memory, a nonvolatile memory, and a flash memory. Further, as machine readable storage media, the nonvolatile memory and the internal storage have computer programs executed by the processor 42 stored thereon.

It should be noted that, the user registration device for a smart robot of the present embodiment is corresponding to the above user registration method of an smart robot, so the contents that are not described in the present embodiment of the user registration device for a smart robot may refer to the relevant illustration of the above embodiments of the user registration method for a smart robot of the present disclosure, and will not be discussed in detail.

In conclusion, according to the technical solutions of the embodiments of the present disclosure, interaction with the user is conducted by a voice dialogue; the biological characteristic information that can uniquely identify the new user to be registered is collected, and at least two different types of biological characteristic information is simultaneously collected; in the collecting process, it is merely required that the collecting of one of the biological characteristic information satisfies the registration condition, and it is not required that the collecting of each type of the biological characteristic information is qualified; then the correspondence relation between the collected biological characteristic information and the user name acquired from the voice dialogue is established, to complete the user registration.

Therefore, compared with the user registration flow in the prior art in which complicated information manual inputting and collecting of more than one type of information of the user are needed, and the more than one type of information must all satisfy the condition to complete the registration, the present disclosure avoids the complicated user interaction operation in the registration process, greatly simplifies the registration steps, facilitates children, the elder and users that do not well know the registration flow to conduct registration, and optimizes the user experience.

What is claimed is:

1. A user registration method for a smart device, comprising:
   conducting, by the smart device, a voice dialogue with a user to be registered;
   acquiring a user name of the user from the voice dialogue, and
   collecting biological characteristic information that is capable of uniquely identifying the user, said collecting being done simultaneously with the voice dialogue,
   wherein the biological characteristic information comprises at least two different types of biological characteristic information collected by a silent collecting mode, and the two different types of biological characteristic information are collected simultaneously without user intervention;
   judging whether at least one type of the biological characteristic information satisfies a corresponding preset registration condition;
   if yes, stopping the collecting of biological characteristic information with the voice dialogue between the smart device and the user not being affected,
   using the biological characteristic information that satisfies the preset registration condition as a characteristic template of said user;
   establishing a correspondence relation between the characteristic template and the user name, and
   saving the correspondence relation,
   whereby if said user is not a registered user, said user is a new user, said correspondence relation completing the user registration.

2. The method according to claim 1, the method further comprises:
   receiving, by said smart device, an awakening instruction given by a predetermined user;
   conducting a voice dialogue with the predetermined user, and
   collecting biological characteristic information of the predetermined user simultaneously with the voice dialogue with the predetermined user;
   searching saved characteristic templates corresponding to each of a number of registered users;
   judging whether said collected biological characteristic information of the predetermined user matches a registered user in the characteristic templates, and
   if not, then the predetermined user is said new user; and
   if yes, the method further comprises:
   identifying the user name of the predetermined user according to the correspondence relation between the corresponding characteristic template and the user name of the registered user.

3. The method according to claim 2, wherein, when the characteristic templates only comprise a first characteristic template corresponding to first biological characteristic information,
   after identifying the user name of the predetermined user, the method further comprises:
   during the process of conducting the voice dialogue with the predetermined user, collecting second biological characteristic information of the predetermined user, wherein said second biological characteristic information type is different from the first biological characteristic information in the first characteristic template, and
   saving the collected second biological characteristic information that satisfies a preset corresponding registration condition to a second characteristic template corresponding to the predetermined user.

4. The method according to claim 3, wherein, after identifying the user name of the predetermined user, the method further comprises:
   calculating whether collected first biological characteristic information corresponding to the first characteristic template is superior to saved first biological characteristic information in the first characteristic template,
   if yes, replacing the saved first biological characteristic information in the first characteristic template with said collected first biological characteristic information, and
   saving said collected first biological characteristic information in said first characteristic template.

5. The method according to claim 4, wherein the step of calculating whether collected first biological characteristic information corresponding to the first characteristic template is superior to saved first biological characteristic information in the first characteristic template further comprises:

calculating a quality score that can be used to evaluate a quality of the collected first biological characteristic information, and comparing the quality score of the collected first biological characteristic information with at least one pre-stored quality score of reference biological characteristic information in the first characteristic templates; and if the quality score of the collected first biological characteristic information is higher than the at least one quality score of the reference biological characteristic information in the first characteristic template, determining that the collected first biological characteristic information is superior to the first biological characteristic information in the first characteristic template.

6. The method according to claim 3, wherein after identifying the user name of the predetermined user, the method further comprises:

calculating whether collected new second biological characteristic information corresponding to the second characteristic template is superior to saved second biological characteristic information in the second characteristic template, and if yes, replacing the second biological characteristic information in the second characteristic template with said collected new second biological characteristic information, and saving the collected new second biological characteristic information in said second characteristic template.

7. The method according to claim 6, wherein the step of calculating whether said collected new second biological characteristic information corresponding to the second characteristic template is superior to saved second biological characteristic information in the second characteristic template further comprises:

calculating a quality score that can be used to evaluate a quality of the collected new second biological characteristic information, and comparing the quality score of the new second biological characteristic information with at least one quality score of the second biological characteristic information in the second characteristic templates; and if the quality score of the collected new second biological characteristic information is higher than the at least one quality score of the second biological characteristic information in the second characteristic template, determining that the collected new second biological characteristic information is superior to the second biological characteristic information in the second characteristic template.

8. The method according to claim 1, wherein said at least two different types of biological characteristic information are voiceprint characteristic information and human face image characteristic information, and wherein the collecting said biological characteristic information that uniquely identifies the user comprises:

obtaining voiceprint characteristic information by extracting from collected and saved user voice data during the voice dialogue with the user, and obtaining human face image characteristic information by extracting human face images from at least one photograph of the user taken and saved during the voice dialogue with the user.

9. The user registration method according to claim 1, wherein said smart device is a robot.

10. A user registration device for a smart device, wherein the smart device comprises: a speaker, a microphone and a camera, the speaker is used to play a guiding voice recorded in advance, the microphone is used to collect user voice data, and the camera is used to collect user's face image;

the user registration device comprises: a machine readable storage medium and a processor, the processor is connected to the speaker, the microphone and the camera, the machine readable storage medium and the processor are communicatively connected by an internal bus, the machine readable storage medium stores a computer program executable by the processor, and when the computer program is executed by the processor the following steps are realized:

conducting a voice dialogue with a user to be registered;

acquiring a user name of the user from the voice dialogue; and collecting biological characteristic information that is capable of uniquely identifying the user, wherein said collecting of said biological characteristic information is done simultaneously with the voice dialogue, and wherein the biological characteristic information comprises at least two different types of biological characteristic information collected by a silent collecting mode, and the two different types of biological characteristic information are collected simultaneously without user intervention;

judging whether at least one type of said two different types of the biological characteristic information satisfies a corresponding preset registration condition; and if at least one type of the biological characteristic information satisfies the corresponding preset registration condition, stopping the collecting of biological characteristic information with the voice dialogue between the smart device and the user not being affected, using the biological characteristic information that satisfies the preset registration condition as a characteristic template;

establishing a correspondence relation between the characteristic template and the user name; and saving the correspondence relation, whereby if said user is not a registered user, said user is a new user, said correspondence relation completing the user registration.

11. The user registration device according to claim 10, wherein when the computer program is executed by the processor the following steps are further realized:

receiving an awakening instruction given by a predetermined user;

conducting a voice dialogue with the predetermined user, and collecting biological characteristic information of the predetermined user simultaneously with the voice dialogue with the predetermined user;

searching saved characteristic templates corresponding to each of a number of registered users and judging whether said collected biological characteristic information of the predetermined user matches a registered user in the characteristic templates;

when it is judged that the collected biological characteristic information of the predetermined user does not match a registered user in the characteristic templates, determining the predetermined user as a new user, and when it is judged that the collected biological characteristic information of the predetermined user matches at least one characteristic template, identifying the user name of the predetermined user according to the correspondence relation between the corresponding characteristic template and the user name of the registered user.

12. The user registration device according to claim 11, wherein when the computer program is executed by the processor the following steps are further realized:
when the characteristic templates only comprise a first characteristic template corresponding to first biological characteristic information, after identifying the user name of the predetermined user, and during the process of collecting the biological characteristic information in the voice dialogue with the predetermined user,
collecting second biological characteristic information of the predetermined user, wherein said second biological characteristic information is different from the first biological characteristic information in the first characteristic template; and
saving second biological characteristic information that satisfies a preset corresponding registration condition to the characteristic template corresponding to the predetermined user, as a second characteristic template.

13. The user registration device according to claim 12, wherein when the computer program is executed by the processor the following steps are further realized:
calculating whether collected first biological characteristic information corresponding to the first characteristic template is superior to saved first biological characteristic information in the first characteristic template, and
if yes, replacing the first biological characteristic information in the first characteristic template with said collected first biological characteristic information, and
saving said collected first biological characteristic information in said first characteristic template;
calculating whether collected new second biological characteristic information corresponding to the second characteristic template is superior to saved second biological characteristic information in the second characteristic template, and
if yes, replacing the second biological characteristic information in the second characteristic template with said collected new second biological characteristic information, and
saving said collected new second biological characteristic information in said second characteristic template.

14. The user registration device according to claim 13, wherein calculating whether collected first biological characteristic information corresponding to the first characteristic template is superior to saved first biological characteristic information in the first characteristic template specifically comprises:
calculating a quality score that can be used to evaluate a quality of the collected first biological characteristic information corresponding to the first biological characteristic information, and
comparing the quality score of the biological characteristic information with at least one pre-stored quality scores of reference biological characteristic information in the first characteristic templates; and
if the quality score of the collected first biological characteristic information is higher than the at least one quality score of the reference biological characteristic information in the first characteristic template, determining that the collected first biological characteristic information is superior to the first biological characteristic information in the first characteristic template.

15. The device according to claim 13, wherein calculating whether said collected new second biological characteristic information corresponding to the second characteristic template is superior to saved second biological characteristic information in the second characteristic template specifically comprises:
calculating a quality score that can be used to evaluate a quality of the collected new second biological characteristic information corresponding to the second biological characteristic information, and
comparing the quality score of the collected new second biological characteristic information with at least one quality score of the second biological characteristic information in the second characteristic template; and
if the quality score of the collected new second biological characteristic information is higher than the at least one quality score of the second biological characteristic information in the second characteristic template, determining that the collected new second biological characteristic information is superior to the second biological characteristic information in the second characteristic template.

16. The user registration device according to claim 10, wherein said smart device is a robot.

* * * * *